United States Patent [19]

Hotta et al.

[11] 4,214,169

[45] Jul. 22, 1980

[54] DEVICE FOR DETECTING AMOUNT OF X-RAY RADIATION

[75] Inventors: Toshihiro Hotta, Misukinoshitayashiki; Takao Makino, Hikone, both of Japan

[73] Assignee: Kabushiki Kaisha Morita Seisakusho, Kyoto, Japan

[21] Appl. No.: 37,498

[22] Filed: May 10, 1979

[30] Foreign Application Priority Data

May 11, 1978 [JP] Japan ................................. 53-56245

[51] Int. Cl.$^3$ ............................................ G03B 41/16

[52] U.S. Cl. .................................... 250/505; 250/322

[58] Field of Search ............... 250/322, 520, 503, 505, 250/445 T

[56] References Cited

U.S. PATENT DOCUMENTS

| | | | |
|---|---|---|---|
| 2,578,722 | 12/1951 | McCartney et al. | 250/505 |
| 4,096,390 | 6/1978 | Hounsfield | 250/445 T |
| 4,166,231 | 8/1979 | Braun | 250/505 |

*Primary Examiner*—Alfred E. Smith
*Assistant Examiner*—T. N. Grigsby
*Attorney, Agent, or Firm*—Koda and Androlia

[57] ABSTRACT

The device makes it possible to expose a patient to an approximate flux of X-ray beams without the interference of light and X-rays from outside in the X-rays from an X-ray's generation source (X-ray tube) during irradiation of the X-rays upon the patient and to detect the dose of X-rays in the form of an electrical signal. In such a process, it uses the signal as a detection medium to a normal dose of X-rays so as to permit the irradiation of an exact and normal amount of X-rays upon the affected part.

2 Claims, 2 Drawing Figures

DEVICE FOR DETECTING AMOUNT OF X-RAY RADIATION

BACKGROUND OF THE INVENTION

1. Field of the Invention

This invention relates to a dental intra-oral X-ray photographing unit and more particularly to an X-ray photographing unit for exposing an X-ray film to imprint an image thereon by inserting the film into the mouth of a patient and irradiating X-rays from outside the mouth.

2. Prior Art

For example, an X-ray photographing unit for intra-oral use in dental treatment is under a restraint wherein a photograph is generally taken by inserting a film into the mouth of a patient. In such a device, the amount of X-ray irradiation is indirectly controlled by regulating the voltage and current of an X-ray tube and the period of time or irradiation. Accordingly, the result is that there is as a result of fluctuations in the voltage and the like of the X-ray tube, variations in the amount of irradiation. Accordingly, repetitive of photographing due to too large or too small of an amount of radiation to the film exposes a patient to overdoses of X-rays and makes it difficult to take X-ray photographs of the same quality.

Accordingly, in an effort to remove the disadvantages of the kind described above, the present inventors provided in their previous U.S. Pat. application Ser. No. 928,057 a system of determining the exact amount of X-rays to be irradiated not by regulating the tube voltage and the like but by detecting the X-ray amount actually irradiated and comparing the integrated value of the X-ray amount with an X-ray amount set point. This prior art was a system of controlling a normal X-ray amount on the basis of a purely electrical circuit device but there was no concrete reference made by the system to the problem of how to detect, in connection with the X-ray tube, the amount of electrical current corresponding to the X-ray amount to be a detection medium.

SUMMARY OF THE INVENTION

This invention is used preferably in combination with the X-ray irradiation amount controlling system of the type described above, and has for its object the provision of a device for detecting X-ray irradiation amount and permitting the proper irradiation of X-rays upon a patient by providing in combination with an X-ray tube a means for correctly detecting an amount of X-rays irradiated from the X-ray tube and at the same time preventing the interference of light and X-rays from outside and apply converging the X-rays irradiated.

BRIEF DESCRIPTION OF THE DRAWINGS

The above-mentioned objects and features of the invention will become more apparent from the following description taken in conjunction with the accompanying drawings in which.

DETAILED DESCRIPTION OF THE INVENTION

Figure 1:
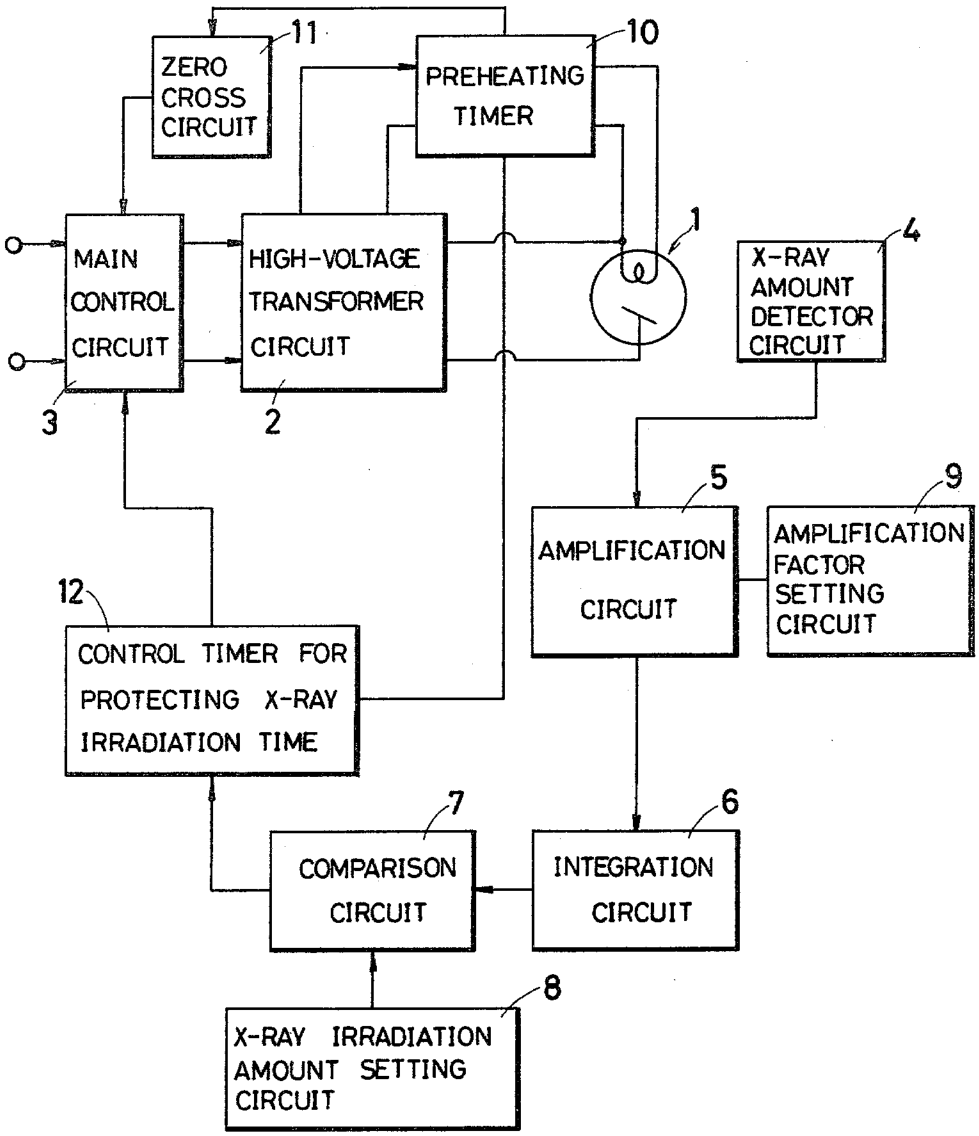
FIG. 1 is a block diagram showing an X-ray irradiation amount controlling device used in combination with the device of this invention.

A description will now be given of one embodiment of the X-ray irradiation amount controlling system used in the device of the present invention with reference to FIG. 1 of the drawings. In the block diagram in FIG. 1, the reference numeral 1 designates an X-ray tube connected to the secondary side of a high-voltage transformer circuit 2; 3 a main control circuit for an X-ray examination apparatus connected to the primary side of the high-voltage transformer circuit 2; 4 an X-ray amount detecting circuit including a pre-amplifier; 5 an amplification circuit; 6 an integration circuit; 7 a comparison circuit; 8 an X-ray irradiation amount setting circuit; 9 an amplification factor setting circuit for selectively setting the amplification factor of the amplification circuit 5; 10 a preheating timer circuit for an X-ray filament (heater); 11 a zero cross circuit; and 12 designates a control timer for protecting an X-ray irradiation time.

Reference will now be made to the circuitry shown in FIG. 1. When X-ray photographing is started, an amplification factor and X-ray dose are beforehand established in the amplification circuit 5 and comparison circuit 7 respectively by the amplification factor setting circuit 9 and the X-ray irradiation amount setting circuit 8, depending upon the film to be used, the affected part of a patient, and the characteristics of individual patients (for example, a difference between a child and a grown-up), as a preliminary procedure for X-ray photographing. When a start switch not shown is depressed, preheating voltage is applied from the high-voltage transformer circuit 2 through the preheating timer 10 to the filament of the X-ray tube 1, whereby the X-ray tube 1 is activated ready for photographing. After a lapse of the preheating time preselected by the preheating timer 10, a signal for starting irradiation is inputted from the main control circuit 3 through the zero cross circuit 11 and the high voltage on the secondary side of the high-voltage transformer circuit 2 is applied to the X-ray tube 1 as tube voltage to thereby start X-ray photographing for a desired period of time. The zero cross circuit 11 is designed to apply the sinusoidal wave AC tube voltage to the X-ray tube 1 invariably from the zero level of the tube voltage to the X-ray tube 1 and to prevent the application of sudden high voltage to the X-ray tube 1. At the same time, the controlling timer 12 for the protection of an X-ray irradiation time starts operating by a signal indicating the termination of the preheating time. When X-rays begin to be irradiated from the X-ray tube 1, the amount of X-ray irradiation is detected by the X-ray dose detecting circuit 4 and is converted into an electric output. The output is amplified in the amplification circuit 5 and thereafter integrated in the integration circuit 6 and inputted to the comparison circuit 7. Because the value of X-ray irradiation amount preset in the X-ray irradiation amount setting circuit 8 is inputted to the comparison circuit 7, comparison is made between both values in the comparison circuit 7. When the integrated value and the set point of X-ray irradiation amount are brought into agreement by continuation of the X-ray irradiation, a feedback signal is given to the main control circuit 3 and energization of the primary side of the high-voltage transformer circuit 2 is stopped. Accordingly, even if tube voltage and the like is changed by fluctuations in power source voltage, an exact amount of X-rays is irradiated. When as a result of a failure no feedback signal from the comparison circuit is inputted to the main control circuit 3 despite there being an agreement between the integrated value and the amount of X-rays irradiated, a stop signal in place of the feed signal is inputted to the control circuit 3 and the controlling timer 12 for protecting an X-ray irradiation time functions to stop the operation of the X-ray tube.

A detailed description will now be given of the device of the invention with reference to FIG. 2. In FIG. 2, the reference numeral 13 designates a cover cylinder which corresponds to an X-ray irradiation barrel. In order to provide a safeguard against transmission of X-rays, the inner circumference of the cover cylinder 13 is lined with a lead film cylinder 16 in the portion between an opening 15 at one end of the cylinder 13 pointed at a patient and a position regulating flange plate 14 provided protrudently in a ringlike manner in about the middle of the inside of the cylinder 13. A lead washer 17 and a print base plate 18 are mounted on the other end side of the cover cylinder 13. A spacer collar **19*a* is provided between plate 18 and lead washer 17. An intensifying screen (flourescent plate) 21 and an external light screening filter 22 are mounted through a short collar 20 to the print base 18. The numeral 23 designates a connector mounting plate whose position with respect to filter 22 is set by collar 19*b* and at the same time a connector 24 is electrically connected to an X-ray irradiation amount detecting element (photoelectric conversion element) 25 on the print base 18. The element 25 is constructed so as to convert the light signal (X-rays) received by the element 25 into an electric signal and to input the signal to the amplification circuit 5 in FIG. 1 through the connector 24. The numeral 26 designates a cover for an outer X-ray tube 27, and the cover 26 is integrally connected to the other end of the cover cylinder 13 by means such as screwing, welding, etc. Inside the outer X-ray tube cover 27 made of a thin film and disposed at a specified distance 28 apart from the cover 26 is provided the X-ray tube 1 and the high-voltage transformer circuit 2. The numeral 29 designates a light conducting cylinder for correctly conducting the X-rays irradiated from the X-ray tube 1 into the cover cylinder 13. The light conducting cylinder 29 is fixed coaxially to the cylinder 13 by means of an adapter 30, and 19*c* designates a collar for fixing the relative position between the connector fixing plate 23 and the light conducting cylinder 29. The collars 19*a*, 19*b*, 19*c* and 20 and inner case cover 27 and light conducting cylinder 29 function to prevent the leakage of X-rays from the X-ray tube in the same manner as the lead film cylinder 16. Between the flange plate 14 and the lead washer 17 is sandwiched a thin filter 31 for interrupting external light. The filter 31 and the filter 22 function to increase the half-value layer of X-rays. Furthermore, the lead washer 17 serves to collect and converge the scattered beams of X-rays diffusedly reflecting within the cover cylinder 13 and to positively impart accurate directionability to the X-rays irradiated from one end of the cover cylinder so as to insure X-ray beams in the specified range of irradiation outside the cover cylinder 13**.

When, in the device of the present invention, tube voltage is applied to the X-ray tube 1 to thereby radiate X-rays, the X-rays radiated, because the X-ray tube 1 is placed in the closed X-ray tube cover 27, enter the cylinder 13 while being converged into beams at an angle formed by the light conducting cylinder 29 and is further converged into a correct flux of beams by the lead washer 17 inside the cylinder 13 and then irradiated from one end 15 of the cylinder 13 upon a patient. At the same time with the irradiation, the X-rays passing through the cylinder 13 strike against the intensifying screen 21 and the screen becomes illuminated and an electrical signal proportional to this degree of brilliance is led outside through the photoelectric conversion element 25 and the connector 24 and inputted to the amplification circuit 5. The remainder of the operation is the same as described with reference to FIG. 1.

Figure 2:
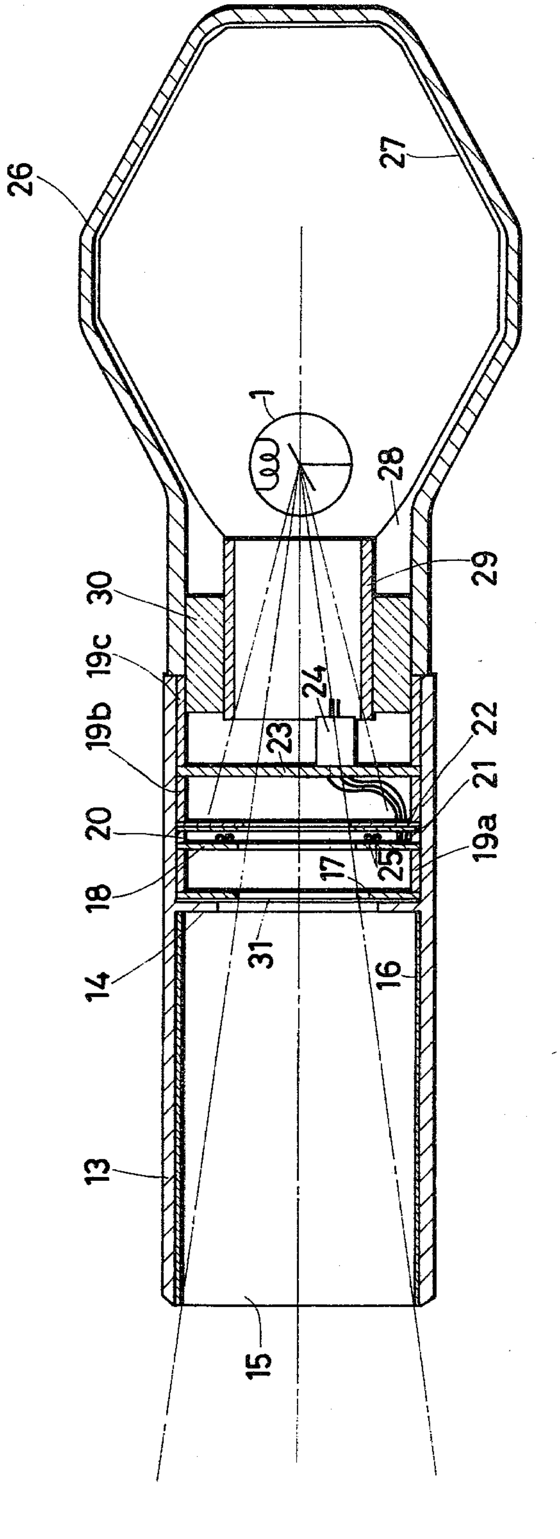
FIG. 2 is an enlarged side view, in longitudinal section, of one preferred embodiment of the X-ray irradiation amount detection device of the invention.

In this manner, the X-ray irradiation amount controlling system in the FIG. 1 block diagram is not a system in which the amount of X-ray irradiation is controlled by regulating tube voltage or the like, but the one in which the amount of X-rays actually irradiated is detected by the X-ray dose detecting device. The amount thus detected is compared with the preset amount, and the supply of voltage to the primary side of high-voltage transformer is stopped when the amount of X-rays actually irradiated is brought into agreement with the preset amount. Accordingly, the device of this invention is useful in that it permits the irradiation of only the exact amount of X-rays and provides a desired X-ray photograph by one shot of photographing, thus suppressing the dose of X-rays to a patient to a minimum level. The X-ray irradiation amount detection device of the present invention used in the control system described above includes a closed casing capable of functioning to interrupt light and X-rays from the outside connected to a cover cylinder at one end opposite an opening of the cylinder on the patient side and is also adjacent to the casing equipped with a light conducting cylinder for converging and conducting the X-rays irradiated from the X-ray tube in the casing exclusively into the cover cylinder, with the result that the X-rays are led to the cover cylinder side, and provided with the desired directionability and converged. In addition, since the device is provided with the cover cylinder and the X-ray converging means disposed inside the cylinder, the device contributes greatly to X-ray photographing in that the device makes it possible to provide a clear picture of the affected part of a patient by the converging beams of X-rays inside the cylinder which are in the state of scattered X-rays into a more positive flux of beams and by applying an exact and normal amount of X-rays to the affected part of the patient in the specified range of irradiation from one end of the cover cylinder. Moreover, the device permits the correct reading of the amount of X-rays irradiated by detection means disposed inside the cover cylinder. As described above, this invention is useful in that it comprises, in combination, a casing for protecting the X-ray tube against external light and X-rays from any direction external or internal, a light conducting cylinder and a cover cylinder used in converging the X-rays irradiated, and an X-ray dose detecting means. This invention is also useful in that, once the interrelative position with respect to each of the elements mentioned is fixed, movement of the device to any place makes it possible to start photographing without adjusting any part of the device.

It should be apparent to those skilled in the art that the above-mentioned embodiment is merely illustrative of but one of the many possible specific embodiments which represent the application of the principles of the present invention. Numerous and varied other arrangements can be readily devised by those skilled in the art without departing from the spirit and scope of the invention.

We claim:

1. A device for detecting an X-ray irradiation amount characterized in that the device comprises connecting a closed case capable of interrupting an X-ray transmission to the other end of a cover cylinder open at one end to the patient side, disposing a light conducting cylinder at the connection between said cover cylinder and said case, said light conducting cylinder condensing and leading the X-rays irradiated from the X-ray tube inside said case exclusively into said cover cylinder, and disposing in said cylinder a means for converging X-rays to be projected from said one end of said cylinder and a means for detecting irradiated X-ray beams.

2. A device according to claim 1 wherein said means for detecting irradiated X-ray beams comprises an intensifying screen and a photoconversion element, whereby the electrical signal converted by said element is led outside from the device and used as an electrical detection medium so as to place said X-ray tube under control of irradiation feedback.

* * * * *